United States Patent
Patterson (10) Patent No.: US 6,480,361 B1
(45) Date of Patent: Nov. 12, 2002

(54) MOVABLE LOAD RAMPS AND CRASH STOP FOR A DISC DRIVE

(75) Inventor: Robert S. Patterson, San Diego, CA (US)

(73) Assignee: Seagate Technologies LLC, Scotts Valley, CA (US)

( * ) Notice: Subject to any disclaimer, the term of this patent is extended or adjusted under 35 U.S.C. 154(b) by 0 days.

(21) Appl. No.: 09/534,897

(22) Filed: Mar. 24, 2000

Related U.S. Application Data (60) Provisional application No. 60/133,022, filed on May 7, 1999.

(51) Int. Cl.[7] ............................. G11B 21/22; G11B 5/54
(52) U.S. Cl. .................................. 360/254.3; 360/265.1
(58) Field of Search ........................... 360/254.3, 254.8, 360/265.1

(56) References Cited

U.S. PATENT DOCUMENTS

| | | | |
|---|---|---|---|
| 4,392,165 A | 7/1983 | Wright | 360/105 |
| 5,023,737 A | 6/1991 | Yaeger | 360/105 |
| 5,079,652 A | 1/1992 | Ishida et al. | 360/75 |
| 5,283,705 A | 2/1994 | Iwabuchi | 360/105 |
| 5,285,338 A | 2/1994 | Sugahara et al. | 360/105 |
| 5,347,414 A | 9/1994 | Kano | 360/105 |
| 5,764,437 A | 6/1998 | Meyer et al. | 360/105 |
| 5,801,899 A | 9/1998 | Genheimer | 360/97.01 |
| 5,831,795 A | 11/1998 | Ma et al. | 360/105 |
| 5,973,887 A * | 10/1999 | Cameron | 360/254.8 |
| 6,011,672 A * | 1/2000 | Matsumoto | 360/265.1 |
| 6,021,019 A | 2/2000 | Genheimer et al. | 360/97.01 |
| 6,084,753 A * | 7/2000 | Gillis et al. | 360/128 |

* cited by examiner

*Primary Examiner*—Hoa T. Nguyen
*Assistant Examiner*—Jennifer M. Dolan
(74) *Attorney, Agent, or Firm*—John R. Wahl; Merchant & Gould P.C.

(57) ABSTRACT

A movable load/unload parking apparatus for a disc drive has an elongated parking member pivotally supported adjacent a data storage disc or stack of discs in the drive. The parking member is operable to move between a first position during drive shutdown and a second position during drive operation. In the first position, a pickup portion of the parking member extends over a peripheral portion of the disc to receive and carry the transducer or transducers beyond the outer diameter of the disc when the actuator rotates the actuator arm outward to a park position. At the same time a crash stop portion of the parking member is repositioned away from the actuator arm to permit the outward rotation. In the second position, the pickup portion of the parking member is positioned beyond the outer diameter of the disc and the crash stop portion is positioned to prevent movement of the actuator arm beyond the outer diameter of the disc.

20 Claims, 4 Drawing Sheets

MOVABLE LOAD RAMPS AND CRASH STOP FOR A DISC DRIVE

RELATED APPLICATIONS

This application claims the benefit of priority of U.S. Provisional Patent Application Ser. No. 60/133,022, filed May 7, 1999, entitled "MOVABLE LOAD RAMPS FOR DISC DRIVE".

TECHNICAL FIELD

The invention relates generally to disc drives and more specifically to a disc drive having a movable load ramp operable to raise read/write transducers off of the disc surface when the drive is not in use to maximize disc real estate available for data.

BACKGROUND

Disc drives are data storage devices that store digital data in magnetic form on a rotating storage medium on a disc. Modern disc drives comprise one or more rigid discs that are coated with a magnetizable medium and mounted on the hub of a spindle motor for rotation at a constant high speed. Information is stored on the discs in a plurality of concentric circular tracks typically by an array of transducers ("transducers") mounted to a rotary actuator for movement of the transducers relative to the discs. Each of the concentric tracks is generally divided into a plurality of separately addressable data sectors. The read/write transducer, e.g. a magnetoresistive read/write transducer, is used to transfer data between a desired track and an external environment. During a write operation, data is written onto the disc track and during a read operation the transducer senses, i.e., "reads" the data previously written on the disc track and transfers the information to the environment external to the head disc assembly. Critical to both of these operations is the accurate locating of the transducer over the center of the desired track.

The transducers are mounted on sliders or heads via flexures at the ends of a plurality of actuator arms that project radially outward from the actuator body. The actuator body pivots about a shaft mounted to the disc drive housing at a position closely adjacent the outer extreme of the discs. The pivot shaft is parallel with the axis of rotation of the spindle motor and the discs, so that the transducers move in a plane parallel with the surfaces of the discs.

Typically, such rotary actuators employ a voice coil motor to position the transducers with respect to the disc surfaces. The actuator voice coil motor includes a coil mounted on the side of the actuator body opposite the transducer arms so as to be immersed in the magnetic field of a magnetic circuit comprising one or more permanent magnets and magnetically permeable pole pieces. When controlled direct current (DC) is passed through the coil, an electromagnetic field is set up which interacts with the magnetic field of the magnetic circuit to cause the coil to move in accordance with the well-known Lorentz relationship. As the coil moves, the actuator body pivots about the pivot shaft and the transducers move across the disc surfaces. The actuator thus allows the transducer to move back and forth in an arcuate fashion between an inner radius and an outer radius of the discs.

When a disc drive is deenergized, the transducers are automatically moved to a storage location or "park" location on the disc surfaces. The park location is typically adjacent and outside the inner or outer periphery of the data storage region of the disc and is typically called a landing zone. This landing zone typically does not contain any useable data as the transducer physically contacts the disc at rest. Consequently, any data stored in this area would likely be lost or compromised. In addition, the landing zone is typically roughened to minimize the stiction of the transducer against the disc surface.

Other disc drives utilize load ramps to facilitate removal of the transducers from the media to a parked position adjacent the discs. The load ramps in a disc drive are typically stationary, such that in the process of the transducer/suspension assemblies being unloaded from the media, the transducers are moved to the outer rim portion of the discs onto ramps which extend over the outer rim portions. They then traverse up the ramps to a park location off of the disc surfaces. In the reverse process, the transducers are loaded onto the media by the transducers moving down the stationary ramps onto the media. This convention requires that some of the disc surface toward the outside radius of the disc not be utilized for data, but for a tolerance band, which is required to ensure that the transducers load and unload onto and off the media at a desirable location without damaging data. This outside tolerance band dimension may be at least partially determined by a requirement that the transducer not contact the edge, or chamfer, on the outside radius of the disc. The inside tolerance band dimension location may be determined by a requirement of not landing on data. The tolerances are primarily due to the dimensionally inaccuracies of the load ramp and its location in relation to the media and transducer/suspension. These tolerances are sensitive to the angle of the load ramp. Another consideration is that, since the circumference of the disc is greatest at the outside radius, the outside area has the highest overall data capacity within a set radial distance. Therefore, restricting a tolerance band to be used for transducer load and unload, rather than using this region for data, is undesirable. Accordingly, there is a continual need for improvements in the art whereby disc drive performance can be optimized by utilizing more of the outer portions of the disc for data storage.

SUMMARY OF THE INVENTION

The present invention provides a solution to the undesirability of having a tolerance band on the outer margin of the disc for loading and unloading the transducer/suspension system. The present invention optimizes the number of data tracks available near the outer margins of the disc and also permit the heads carrying the transducers to land on the disc over data containing tracks. The present invention is a movable load/unload parking apparatus which preferably has an elongated pivoting parking member mounted adjacent the disc or discs for rotation about an axis parallel to the axis of rotation of the discs. The pivoting parking member has a pickup portion projecting from a central pivot portion and a crash stop portion projecting from the central pivot portion in a direction generally opposite to that of the load ramp portion.

The movable load ramp and crash stop member is operable between a first position and a second position. In the first position, the pickup portion has a distal end extending over a peripheral portion of the disc or discs to receive the distal end of the actuator arm and lift the transducer from its flying height above the disc surface as the actuator arm is rotated toward the outer diameter of the disc upon drive shutdown and hold the transducer in a parked position beyond the outer diameter of the disc during drive shutdown conditions. At the same time, the crash stop portion rotates away from the disc to permit the actuator assembly to rotate the actuator arm carrying the transducer beyond the outer diameter of the disc. During drive operation, the movable load ramp and crash stop member is located in a second position with the pickup portion away from the peripheral portion of the disc and the crash stop portion in a position to interfere with rotation of the actuator assembly beyond the outer diameter of the disc thereby preventing the transducer from going beyond the data region of the disc while allowing the transducer to read and write data to the disc in the peripheral region of the disc near the outer diameter of the disc. The elongated parking member is preferably biased toward the first position so that upon a power loss, the parking member automatically rotates to the first position.

These and other features as well as advantages that characterize the present invention will be apparent from a reading of the following detailed description and a review of the associated drawings.

DETAILED DESCRIPTION OF THE INVENTION

Figure 1:
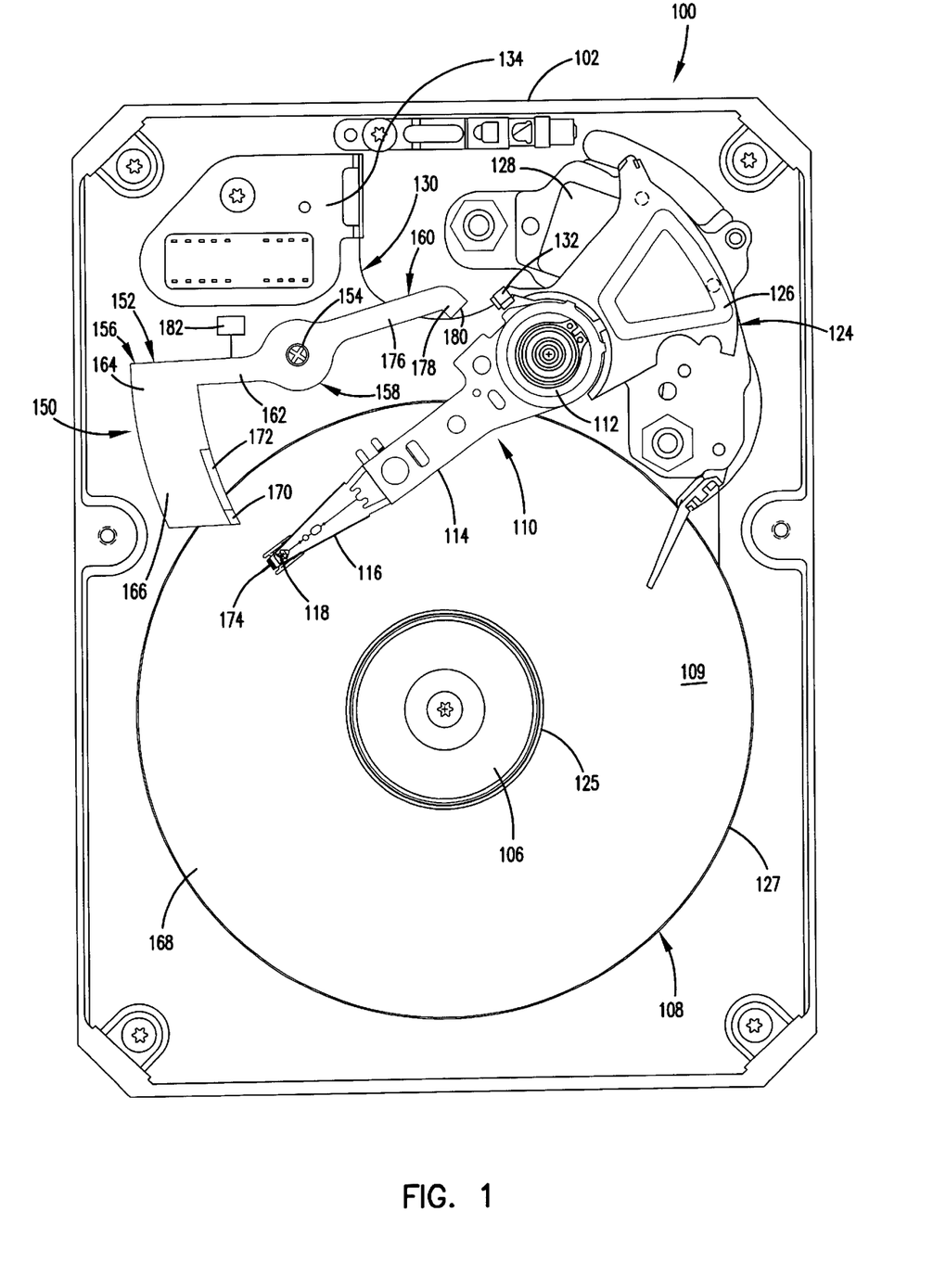
FIG. 1 is a plan view of a disc drive in accordance with a preferred embodiment of the present invention in which the actuator arm and transducers are over the disc media and the movable ramp is rotated toward the disc to receive the actuator arms.

A disc drive 100 constructed in accordance with a preferred embodiment of the present invention is shown in FIG. 1. The disc drive 100 includes a base 102 to which various components of the disc drive 100 are mounted. A top cover, not shown, cooperates with the base 102 to form an internal, sealed environment for the disc drive in a conventional manner. This sealed assembly is called a head disc assembly (HDA). The primary internal components include a spindle motor 106 which rotates one or more data storage discs 108 at a constant high speed. Although in the plan views of the drive 100 shown in this specification only one disc is visible, several discs may be stacked vertically on the spindle motor 106.

Information is written to and read from tracks coded in the data region 109 on the discs 108 through the use of an actuator assembly 110, which rotates on a bearing shaft assembly 112 positioned adjacent the discs 108. The actuator assembly 110 includes a plurality of actuator arms 114 which extend over the surfaces of the discs 108, with one or more flexures 116 extending from the distal end of each of the actuator arms 114. Mounted under the distal end of each of the flexures 116 is a head or slider carrying a transducer 118. The slider is typically a gimbal mounted air bearing slider with an aerodynamically shaped bottom surface enabling the slider, and hence the transducer 118, to fly in close proximity above the corresponding surface of the associated disc 108. The plan view of the actuator assembly 110 shows only one of the actuator arms 114. In practice, there are usually one more actuator arms 114 than there are discs 108 in the drive 100. For example, if there is only one disc, there are typically two actuator arms 114. If there are two discs 108 in the drive 100, there are usually three actuator arms 114. If there are three discs in the drive 100, there will usually be four actuator arms 114 which extend parallel to each other like tines on a comb. The two interior arms 114, in such a three disc configuration, will usually each carry two flexures each supporting a transducer 118. The bottom and top arms 114, will each carry one flexure and transducer 118. A total of six transducers 118, one for each disc surface, would be carried in the actuator assembly 110 in a three disc configuration.

The radial position of the transducers 118 over the disc 108 is controlled by the positioning of the actuator arms 114 through the use of a voice coil motor (VCM) 124, which typically includes a coil 126 attached to bearing shaft assembly 112 of the actuator assembly 110, opposite to the actuator arms 114, as well as one or more stationary permanent magnets and return plates 128 which are spaced apart and establish a vertical magnetic field between them in which the coil 126 is immersed. The upper magnets and return plates 128 have been removed in the plan views of FIGS. 1–4 for clarity in showing the coil 126. The controlled application of current to the coil 126 causes magnetic interaction between the permanent magnets 128 and the coil 126 so that the coil 126 moves in accordance with the well known Lorentz relationship. As the coil 126 moves, the actuator assembly 110 pivots on the bearing shaft assembly 112 causing the transducers 118 to move between an inner diameter 125 and an outer diameter 127 over the surfaces of the disc or discs 108.

A flex assembly 130 provides the requisite electrical connection paths for the actuator assembly 110 while allowing pivotal movement of the actuator assembly 110 during operation. The flex assembly 130 attaches to the actuator assembly 110 at a flex bracket 132 in FIG. 1. The flex assembly 130 includes a printed circuit board 134 to which head wires (not shown) are electrically connected; the head wires being routed from the flex bracket 132 along the actuator arms 114 and the flexures 116 to the transducers 118. The printed circuit board 134 typically includes circuitry for controlling the write currents applied to the transducers 118 during a write operation and for amplifying read signals generated by the transducers 118 during a read operation. The printed circuit board 134 is attached to a bracket mounted to the base deck 102 of the head disc assembly for communicating through the base deck 102 to a disc drive printed circuit board (not shown) mounted to the bottom side of the disc drive 100.

Figure 2:
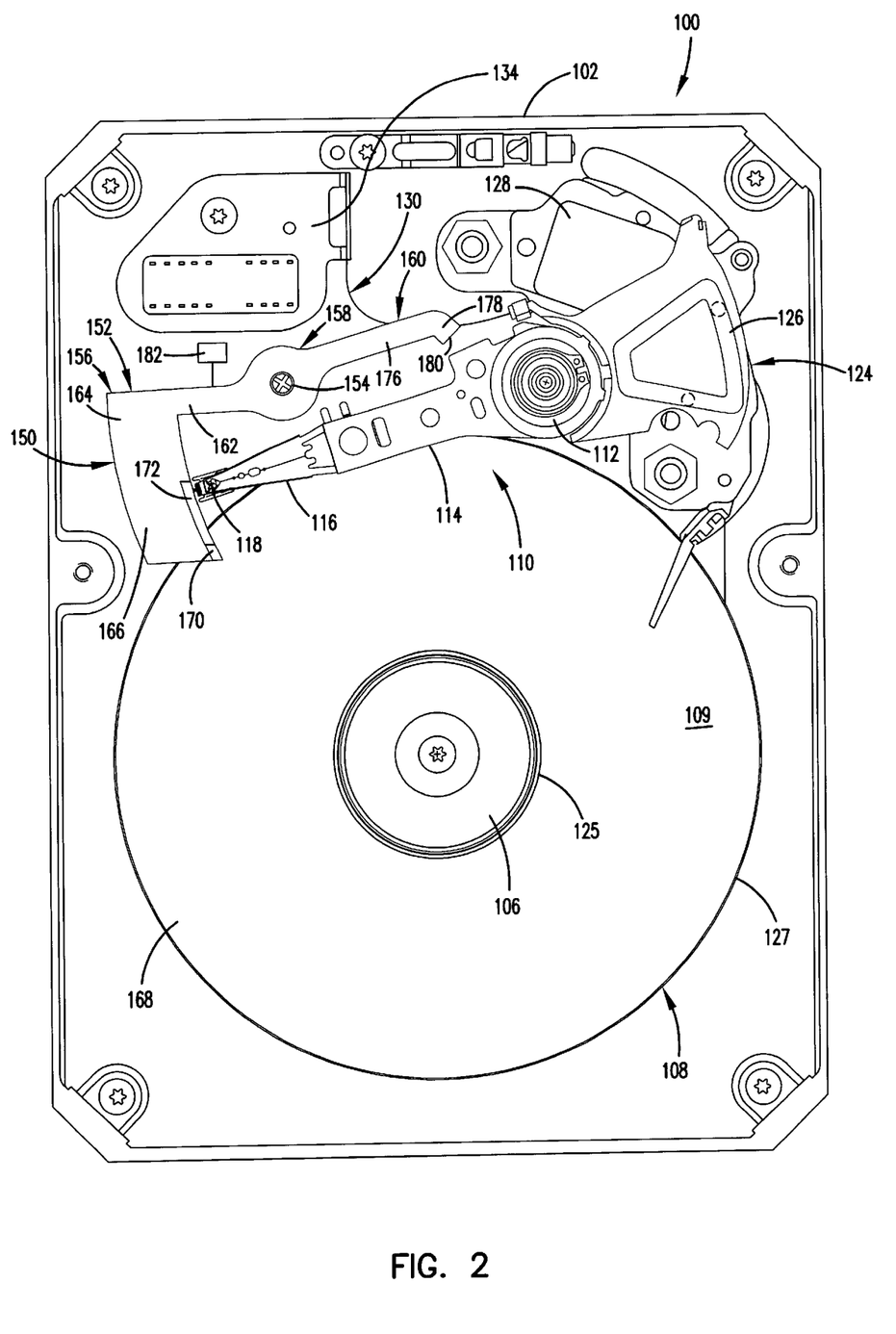
FIG. 2 is a plan view of the disc drive as in FIG. 1 with the actuator arms fully rotated clockwise so that the transducers are carried by the movable load ramps and are removed from over the disc surfaces.
Figure 3:
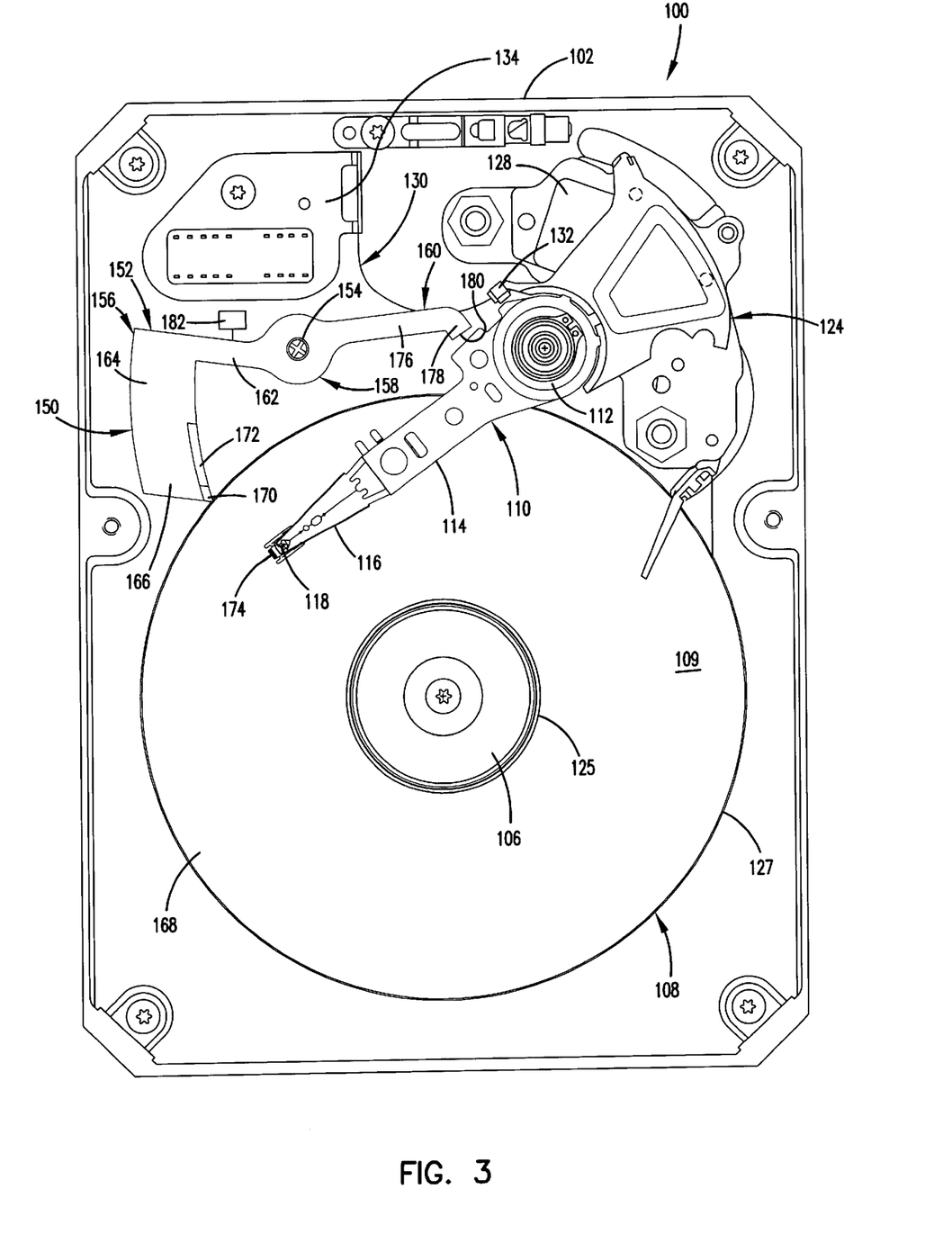
FIG. 3 is a plan view of the disc drive as in FIG. 1 with the actuator arms and transducers are over the disc media during normal operation and the load ramps and crash stop positioned with the crash stop in operating position.
Figure 4:
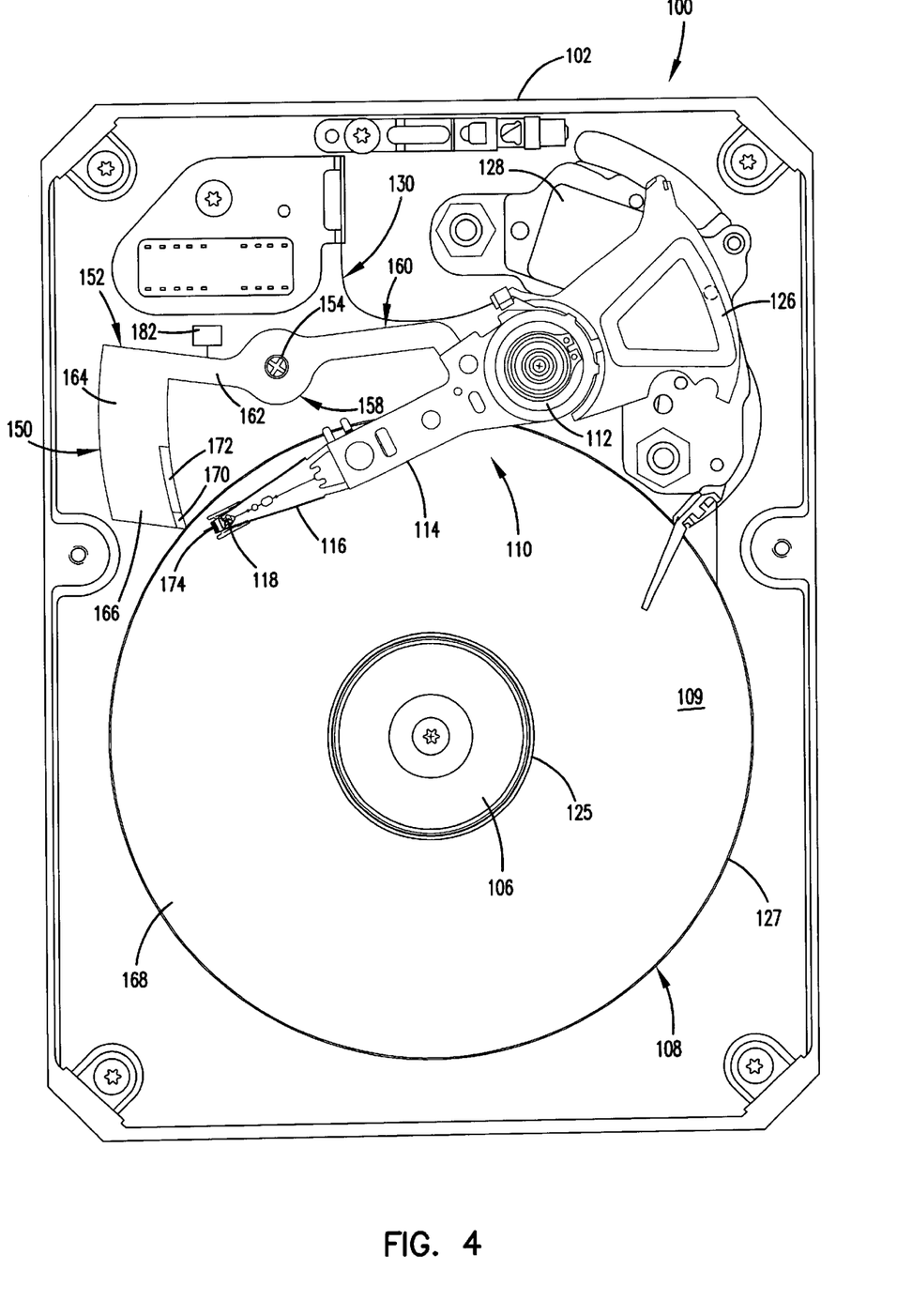
FIG. 4 is a plan view of the disc drive as in FIG. 3 with the actuator arms rotated to butt against the crash stop with the transducers still remaining over the data portion of the disc surface.

The disc drive 100 has a movable load/unload parking apparatus 150 in accordance with a preferred embodiment of the present invention for securing the transducers 118 off of the discs 108 during shutdown conditions as shown in FIG. 2 and preventing the transducers from being rotated beyond the outer diameter 127 of the discs 108 during drive operations as shown in FIGS. 3 and 4. Specifically, the parking apparatus 150 is selectively movable between a first position shown in FIGS. 1 and 2, which is used during drive shutdown, and a second position, which is used during drive operation, as is shown in FIGS. 3 and 4.

The movable parking apparatus 150 includes an elongated parking member 152 pivotally mounted to a bearing shaft assembly 154 which is in turn fastened to the base plate 102 adjacent the discs 108. The elongated parking member 152 has a transducer pickup portion 156 extending from a central pivot portion 158 on the bearing shaft assembly 154 and has an elongated crash stop portion 160 extending from the central pivot portion 158 in a direction generally opposite to that of the pickup portion 156 so that as when the parking member 152 rotates counterclockwise to move the pickup portion 156 toward the disc 108, the crash stop portion 160 moves away from the disc 108.

The pickup portion 156 has a general L shape with a first leg 162 generally extending alongside the disc 108 from the pivot portion 158 to a comb-like second leg 164 which extends toward the disc or discs 108. The comb-like leg 164 has a set of parallel tines 166, each of which extends over a peripheral portion 168 of the surface of one of the discs 108. Each of the tines 166 is spaced vertically from an adjacent tine 166 by a gap sufficient to receive the disc 108 therein so that when the parking member is in the first position as shown in FIGS. 1 and 2, two adjacent tines 166 sandwich the peripheral portion 168 of a disc 108 between them. Each of the tines 166 preferably has a curved edge facing toward a the actuator assembly 110. This curved edge preferably has a radius of curvature slightly larger than the length of the actuator assembly 110. Along this curved edge of the tine 166 is an upwardly inclined ramp surface region 170 and a grooved, generally flat horizontal transducer holding surface region 172 adjacent and contiguous with the ramp region 170. When the drive 100 in a shut down condition, the transducers 118 are positioned as in FIG. 2, with the transducers supported on the holding surface region 172, away from the discs 108.

A pin 174 extending from the distal end of the gimbal supporting the transducer 118 rides on the ramp region 170 to lift the head 118 from its flying height position above the disc 108 during the transition from drive operation to drive shutdown as the actuator assembly 110 is rotated from the position shown in FIG. 1 to the parked position shown in FIG. 2. In FIG. 2, the pin 174 has moved off of the ramp region 170 onto the holding region 172, thus supporting the head 118 away from the disc 108.

The crash stop portion 160 extends from the central pivot portion 158 of the parking member 152 in a direction substantially opposite to that of the pickup portion 156. The crash stop portion 160 has a long leg 176 extending from the pivot portion 158 alongside the disc 108 to a short leg 178 which extends toward the disc 108. The short leg 178 terminates in a flat end surface forming a crash stop 180 positioned to engage the actuator arm 114 during drive operation if the actuator assembly 110 is rotated outward to the outer diameter 127 of the disc 108. During drive operation, the parking member 152 is positioned in a second position as is shown in FIGS. 3 and 4. In this second position, the parking member 152 is rotated clockwise about the bearing shaft assembly 154 so that the pickup portion 156 is substantially away from the peripheral region 168 of the disc 108. At the same time, the crash stop 180 is rotated to a position to interfere with further outward rotation of the actuator assembly 110 than is shown in FIG. 4 in which the head 118 is adjacent the outer diameter 127 of the disc 108. Thus the crash stop 180 prevents the transducer 118 from going beyond the outer diameter 127 of the disc 108.

The parking apparatus 150 includes a biasing device 182, shown schematically in the figures, for rotating the parking member 152 from the first position shown in FIGS. 1 and 2 to the second position shown in FIGS. 3 and 4. This biasing device 182 may have a spring on the bearing shaft assembly biasing the member 152 counterclockwise and have a separate electromagnet positioned to overcome the spring bias when energized, during drive startup and operation, which rotates and holds the parking arm clockwise in the second position. Alternatively, the biasing device 182 may be an electromagnet/spring assembly coupled to the pickup portion 156 or crash stop portion 160, which, when de-energized, places the parking arm in the first position and when energized, rotates and retains the parking arm 152 to the second position. Another alternative embodiment of the biasing device 182 may not involve a spring which directly biases the parking member counterclockwise, but may include a bistable latching device which draws no power except during the transitions between each of the first and second positions. Any such arrangement may be used.

The parking apparatus 150 is operated as follows. During drive shutdown conditions, the parking member 152 is in the first position as is shown in FIGS. 1 and 2. The actuator assembly 110 is rotated clockwise during power down so as to position the transducers 118 off of the disc 108 with the pins 174 riding on the holding portions 172 of the tines 166 as shown in FIG. 2 at all times when power is removed. When the drive is started up, the discs 108 begin to spin. When the discs 108 are spinning at a speed above the takeoff velocity of the transducers 118 over the surfaces of the disc 108, the actuator assembly 110 is rotated counterclockwise to move the transducers 118 from the parked position, off of the holding region 172, down the ramp region 170 and over to the data region 109 of the disc 108 as is shown in FIG. 1. Once the actuator assembly 110 is rotated counterclockwise off of the pickup portion 156, the biasing device 182 is energized, rotating the parking arm 152 clockwise to move the tines 166 away from over the peripheral portion 168 of the disc or discs 108. At the same time, the crash stop portion 160 of the parking member 152 rotates clockwise toward the disc 108 to position the crash stop 180 in position to prevent the transducers 118 from moving past the outer diameter of the disc 108, i.e. prevent further rotation of the actuator assembly 110 beyond the disc 108 as is shown in FIG. 4. The parking apparatus 150 is maintained in this second position throughout drive operation.

When power is lost or removed from the disc drive 100, the biasing device 182 rotates the parking arm counterclockwise back to the position shown in FIG. 1. At this point in time, the actuator assembly 110 will likely be in a position as shown in FIG. 1. As the disc spin motor 106 slows down, the residual energy of disc motion may be used to drive the actuator assembly 110 clockwise to the parked position shown in FIG. 2, either after the parking member 152 reaches the first position or simultaneously with the counterclockwise rotation to the first position, depending on the control scheme.

In summary, the present invention is included in a disc drive (such as 100) having a data storage disc (such as 108) rotatably mounted on a spin motor (such as 106) and an actuator assembly (such as 110) operably arranged adjacent the data storage disk (such as 108) for movement of an actuator arm (such as 114) carrying a transducer (such as 118) over a surface of the disc. The disc (such as 108) has an outer diameter (such as 127) and a data storage region on a surface thereof and a movable load/unload parking apparatus (such as 150) positioned adjacent the disc (such as 108). The apparatus (such as 150) is operable to move a parking member (such as 152) between a first position during drive shutdown and a second position during drive operation. In the first position, a pickup portion (such as 156) of the parking member (such as 152) extends over a peripheral portion (such as 168) of the disc (such as 108) to receive and carry the transducer (such as 118) beyond the outer diameter (such as 127) of the disc (such as 108). The parking member (such as 152) has a crash stop portion (such as 160) positioned away from the actuator arm (such as 110) in this first position. In the second position, the pickup portion (such as 156) of the parking member (such as 152) is positioned beyond the outer diameter (such as 127) of the disc (such as 108) and the crash stop portion (such as 160) is positioned to prevent movement of the actuator arm (such as 114) beyond the outer diameter (such as 127) of the disc (such as 108).

The parking portion (such as 156) of the parking member (such as 152) has an inclined ramp region (such as 170) for lifting the transducer (such as 118) above the disc surface as the actuator arm (such as 114) is rotated toward the outer perimeter (such as 127) of the disc (such as 108) during drive shutdown. The parking portion (such as 156) further has a substantially flat transducer holding region (such as 172) joining the ramp region (such as 170) for holding the transducer (such as 118) away from the outer diameter (such as 127) of the disc (such as 108) when the drive (such as 100) is shutdown.

During a transition from drive operation to drive shutdown the parking member (such as 152) rotates from the second position (such as is shown in FIGS. 3 and 4) to the first position (such as is shown in FIGS. 1 and 2) before the outwardly rotating actuator arm (such as 114) reaches the inclined ramp region (such as 170) of the parking member (such as 152). Conversely, the parking member (such as 152) operably rotates from the first position to the second position after the actuator arm (such as 114) rotates inwardly away from the inclined ramp region (such as 170) to the data region of the disc (such as 109) during drive startup, i.e. a transition from drive shutdown to drive operation.

The parking member (such as 152) is an elongated body having a central pivot portion (such as 158) between the pickup portion (such as 156) and the crash stop portion (such as 160) and is preferably biased in the first position by a biasing device (such as 182). The pickup portion (such as 156) has a leg (such as 162) joining the central pivot portion (such as 158) and a leg (such as 164) joining the leg (such as 162) and extending from the leg (such as 162) toward the disc (such as 108). The actuator assembly (such as 110) has a lift pin (such as 174) extending from a distal end adapted to engage the pickup portion (such as 156) of the parking member (such as 152). The leg (such as 164) has a curved edge forming an inclined ramp region (such as 170) and a flat transducer holding region (such as 172) for receiving and carrying the transducer (such as 118) away from the disc (such as 108).

Stated another way, the present invention may be viewed as a movable load/unload parking apparatus (such as 150) for a disc drive (such as 100) having an actuator assembly (such as 110) positioned adjacent a rotating data storage disc (such as 108). The actuator assembly (such as 110) has an actuator arm (such as 114) carrying a transducer (such as 118) for movement over a surface of the disc (such as 108). The parking apparatus (such as 150) preferably has a parking member (such as 152) pivotally supported adjacent the data storage disc (such as 108) operable to move between a first position during drive shutdown (such as is shown in FIGS. 1 and 2) and a second position (such as is shown in FIGS. 3 and 4) during drive operation. In the first position, a pickup portion (such as 156) of the parking member (such as 152) extends over a peripheral portion (such as 168) of the disc to receive and carry the transducer (such as 118) beyond the outer diameter (such as 127) of the disc (such as 108) and a crash stop portion (such as 160) of the parking member (such as 152) is positioned away from the actuator arm (such as 114). In the second position, the pickup portion (such as 156) of the parking member (such as 152) is positioned beyond the outer diameter (such as 127) of the disc (such as 108) and the crash stop portion (such as 160) is positioned to prevent movement of the actuator arm (such as 114) beyond the outer diameter of the disc (such as 108).

The parking portion (such as 156) of the parking member (such as 152) has an inclined ramp region such as 170) for lifting the transducer (such as 118) above the disc surface as the actuator arm (such as 114) is rotated toward the outer perimeter (such as 127) of the disc during drive shutdown and a substantially flat transducer holding region (such as 172) adjacent the lifting region (such as 170) for holding the transducer (such as 118) away from the outer diameter (such as 127) of the disc (such as 108) when the drive is shutdown.

During a transition from drive operation to drive shutdown, the parking member (such as 152) rotates from the second position to the first position before the outwardly rotating actuator arm (such as 114) causes the transducer (such as 118) to reach the inclined ramp region (such as 170) of the parking member (such as 152) and operably rotates from the first position to the second position after the actuator arm (such as 114) rotates inwardly to move the transducer (such as 118) away from the inclined ramp region (such as 170) during a transition from drive shutdown to drive operation. Again, the parking member (such as 152) is an elongated body having a central pivot portion (such as 158) between the pickup portion (such as 156) and the crash stop portion (such as 160) and the parking member (such as 152) is preferably biased in the first position. The pickup portion (such as 156) has a leg (such as 162) joining the central pivot portion (such as 158) and a comb like leg (such as 164) having one end joining the leg (such as 162) and another end extending from the leg (such as 162) toward the disc (such as 108). The actuator assembly (such as 110) has a lift pin (such as 174) extending from a distal end adapted to engage the pickup portion (such as 156) of the parking member (such as 152). The comb like leg (such as 164) has a curved edge forming an inclined ramp region (such as 170) and a flat transducer holding region (such as 172) for receiving and carrying the transducer (such as 118) away from the disc(such as 108).

The crash stop portion (such as 160) has an L shape with a long leg (such as 176) joining the central pivot portion (such as 158) and a short leg (such as 178) joining the long leg (such as 176), wherein the distal end (such as 180) of the short leg (such as 178) acts as the crash stop in the second position.

The present invention may also be viewed as a method of parking an actuator arm assembly (such as 110) having an actuator arm (such as 114) carrying a transducer (such as 118) over a data storage disc (such as 108) in a disc drive (such as 100) upon drive shutdown such that the transducer (such as 118) is removed from the disc (such as 108) during shutdown conditions. The disc (such as 108) has an inner diameter (such as 125) and an outer diameter (such as 127) and a peripheral portion (such as 168) adjacent the outer diameter (such as 127). The method has a first step of providing an elongated parking member (such as 152) pivotally supported adjacent the data storage disc (such as 108), the parking member (such as 152) having a central pivot portion (such as 158), an elongated pickup portion (such as 156) extending from the central pivot portion (such as 158) in one direction and an elongated crash stop portion (such as 160) extending from the central pivot portion (such as 158) in another direction. The parking member (such as 152) is operable between a first position during drive shutdown and a second position during drive operation in which the pickup portion (such as 156) of the parking member is positioned beyond the outer diameter (such as 127) of the disc (such as 108) and the crash stop portion (such as 160) is positioned to prevent movement of the actuator arm (such as 114) beyond the outer diameter (such as 127) of the disc (such as 108). The second step is moving the parking member (such as 152) to the first position wherein the pickup portion (such as 156) of the parking member extends over a peripheral portion (such as 168) of the disc (such as 108) to receive and carry the transducer (such as 118) beyond the outer diameter (such as 127) of the disc. The third step involves moving the crash stop portion (such as 160) of the parking member (such as 152) away from the actuator arm (such as 114) to permit the actuator arm to rotate the transducer (such as 118) beyond the outer diameter (such as 127) of the disc (such as 108). The fourth step is rotating the actuator assembly (such as 110) outward so that the pin (such as 174) rides onto the pickup portion (such as 156) of the parking member (such as 152). Finally, the method may also include further rotating the actuator assembly (such as 110) outward to position the transducer (such as 118) above and beyond the outer diameter of the disc so as to be carried by the holding region (such as 172) of the pickup portion (such as 156) of the parking member (such as 152) as shown in FIG. 2).

It will be clear that the present invention is well adapted to attain the ends and advantages mentioned as well as those inherent therein. While a presently preferred embodiment has been described for purposes of this disclosure, numerous changes may be made which will readily suggest themselves to those skilled in the art and which are encompassed in the spirit of the invention disclosed and as defined in the appended claims.

What is claimed is:

1. A disc drive having a data storage disc rotatably mounted on a spin motor and an actuator assembly operably arranged adjacent the data storage disk for movement of an actuator arm carrying a transducer over a surface of the disc, the disc having an outer diameter and a data storage region on a surface thereof, the drive comprising:

a movable load/unload parking apparatus positioned adjacent the disc operable to move a parking member between a first position during drive shutdown and a second position during drive operation, wherein, in the first position, a pickup portion of the parking member extends over a peripheral portion of the disc to receive and carry the transducer beyond the outer diameter of the disc and a crash stop portion of the parking member is positioned away from the actuator arm, and, in the second position, the pickup portion of the parking member is positioned beyond the outer diameter of the disc and the crash stop portion is positioned to prevent movement of the actuator arm beyond the outer diameter of the disc.

2. The disc drive according to claim 1 wherein the pickup portion of the parking member has an inclined ramp region for lifting the transducer above the disc surface as the actuator arm is rotated toward the outer diameter of the disc during drive shutdown.

3. The disc drive according to claim 2 wherein the pickup portion further comprises a substantially flat transducer holding region joining the ramp region for holding the tansducer away from the outer diameter of the disc when the drive is shutdown.

4. The disc drive according to claim 1 wherein during a transition from drive operation to drive shutdown the parking member rotates from the second position to the first position before the outwardly rotating actuator arm reaches the inclined ramp region of the parking member.

5. The disc drive according to claim 4, wherein the parking member operably rotates from the first position to the second position after the actuator arm rotates inwardly away from the inclined ramp region during a transition from drive shutdown to drive operation.

6. The disc drive according to claim 1 wherein the parking member is an elongated body having a central pivot portion between the pickup portion and the crash stop portion biased in the first position.

7. The disc drive according to claim 6 wherein the pickup portion has a first leg joining the central pivot portion and a second leg joining the first leg and extending from the first leg toward the disc.

8. The disc drive according to claim 1 wherein the actuator assembly has a lift pin extending from a distal end of a flexure attached to the actuator arm adapted to engage the pickup portion of the parking member.

9. The disc drive according to claim 7 wherein the second leg has a curved edge forming an inclined ramp region and a flat transducer holding region for receiving and carrying the transducer away from the disc.

10. A movable load/unload parking apparatus for a disc drive having an actuator assembly positioned adjacent a rotating data storage disc, the actuator assembly having an actuator arm carrying a transducer for movement over a surface of the disc, the parking apparatus comprising:

a parking member pivotally supported adjacent the data storage disc operable to move between a first position during drive shutdown and a second position during drive operation, wherein, in the first position, a pickup portion of the parking member extends over a peripheral portion of the disc to receive and carry the transducer beyond the outer diameter of the disc and a crash stop portion of the parking member is positioned away from the actuator arm, and, in the second position, the pickup portion of the parking member is positioned beyond the outer diameter of the disc and the crash stop portion is positioned to prevent movement of the actuator arm beyond the outer diameter of the disc.

11. The apparatus according to claim 10 wherein the pickup portion of the parking member has an inclined ramp region for lifting the transducer above the disc surface as the actuator arm is rotated toward the outer perimeter of the disc during drive shutdown and a substantially flat transducer holding region adjacent the ramp region for holding the transducer away from the outer diameter of the disc when the drive is shutdown.

12. The apparatus according to claim 11 wherein during a transition from drive operation to drive shutdown the parking member rotates from the second position to the first position before the outwardly rotating actuator arm reaches the inclined ramp region of the parking member and operably rotates from the first position to the second position after the actuator arm rotates inwardly away from the inclined ramp region during a transition from drive shutdown to drive operation.

13. The apparatus according to claim 11 wherein the crash stop portion has an L shape with a long leg joining the central pivot portion and a short leg joining the long leg, wherein the distal end of the short leg acts as the crash stop in the second position.

14. The apparatus according to claim 11 wherein the parking member is an elongated body having a central pivot portion between the pickup portion and the crash stop portion and the parking member is biased in the first position.

15. The apparatus according to claim 14 wherein the pickup portion has a first leg joining the central pivot portion and a comb-like leg joining the first leg and extending from the first leg toward the disc.

16. The apparatus according to claim 15 wherein the comb-like leg has one or more tines each having a curved edge forming the inclined ramp region and the flat traducer holding region for receiving and carrying the transducer away from the disc.

17. The apparatus according to claim 10 wherein the actuator assembly has a lift pin extending from a distal end of a flexure attached to the actuator arm adapted to engage the pickup portion of the parking member.

18. A method of parking an actuator arm assembly having an actuator arm carrying a transducer over a data storage disc in a disc drive upon drive shutdown such that the transducer is removed from the disc during shutdown conditions, wherein the disc has an inner diameter and an outer diameter and a peripheral portion adjacent the outer diameter, the method comprising the steps of:

(a) providing an elongated parking member pivotally supported adjacent the data storage disc, the parking member having a central pivot portion, an elongated pickup portion extending from the central pivot portion in one direction and an elongated crash stop portion extending from the central pivot portion in another direction, the parking member being operable between a first position during drive shutdown and a second position during drive operation having the pickup portion of the parking member positioned beyond the outer diameter of the disc and the crash stop portion positioned to prevent movement of the actuator arm beyond the outer diameter of the disc;

(b) moving the parking member to the first position wherein the pickup portion of the parking member ends over a peripheral portion of the disc to receive and carry the transducer beyond the outer diameter of the disc;

(c) moving the crash stop portion of the parking member away from the actuator arm to permit the actuator arm to rotate the transducer beyond the outer diameter of the disc; and (d) rotating the actor assembly outward onto the pickup portion of the parking member.

19. The method according to claim 18 comprising the step of:

(e) further rotating the actuator assembly outward to position the transducer above and beyond the outer diameter of the disc and carried by the pickup portion of the parking member.

20. A disc drive having a rotating data storage disc, the drive comprising:

an actuator assembly having an actuator arm carrying a transducer over the disc; and means for removing a crash stop from interfering with actuator arm movement beyond the disc and parking the transducer away from the disc upon drive shutdown and positioning the crash stop to prevent movement of the actuator arm beyond the disc during drive operation.

* * * * *

UNITED STATES PATENT AND TRADEMARK OFFICE
CERTIFICATE OF CORRECTION

PATENT NO. : 6,480,361 B1
DATED : November 12, 2002
INVENTOR(S) : Robert S. Patterson It is certified that error appears in the above-identified patent and that said Letters Patent is hereby corrected as shown below:

<u>Title page,</u>
Item [73], Assignee, delete "Seagate Technologies LLC" and insert therefore
-- Seagate Technology LLC --.

Signed and Sealed this

Eighth Day of April, 2003

JAMES E. ROGAN
*Director of the United States Patent and Trademark Office*